United States Patent
Pere et al.

[15] 3,689,042
[45] Sept. 5, 1972

[54] AUTOMATIC CONTROL APPARATUS FOR SOAKING PIT FURNACES

[72] Inventors: Carlo Pere, 2, Via Mura del Prato; Fulvio Tornich, 18, Via Bottini; Tranquillo Macor, 22, Via Piaggio, all of Genoa, Italy

[22] Filed: Nov. 10, 1970

[21] Appl. No.: 88,325

[30] Foreign Application Priority Data

Nov. 17, 1969 Italy..................7451 A/69

[52] U.S. Cl..............................263/40 R, 236/15 B
[51] Int. Cl.........................................F27b 3/02
[58] Field of Search..............263/40, 52; 236/15 B

[56] References Cited

UNITED STATES PATENTS 2,656,172  10/1953  McGough..................263/52
2,776,827  1/1957   Graham.....................263/52

*Primary Examiner*—John J. Camby
*Attorney*—Berman, Davidson and Berman

[57] ABSTRACT

An automatic regulating device for a pit furnace for heating metal ingots includes two temperature sensors for controlling the power of the pit burner. One sensor detects the temperature of the furnace walls and controls the burner in a heating-up period of the furnace. A second sensor detects the temperature of the combustion gases and controls the burner during the soaking period. The second sensor is located in the outlet passage of the furnace for combustion gases.

1 Claim, 3 Drawing Figures

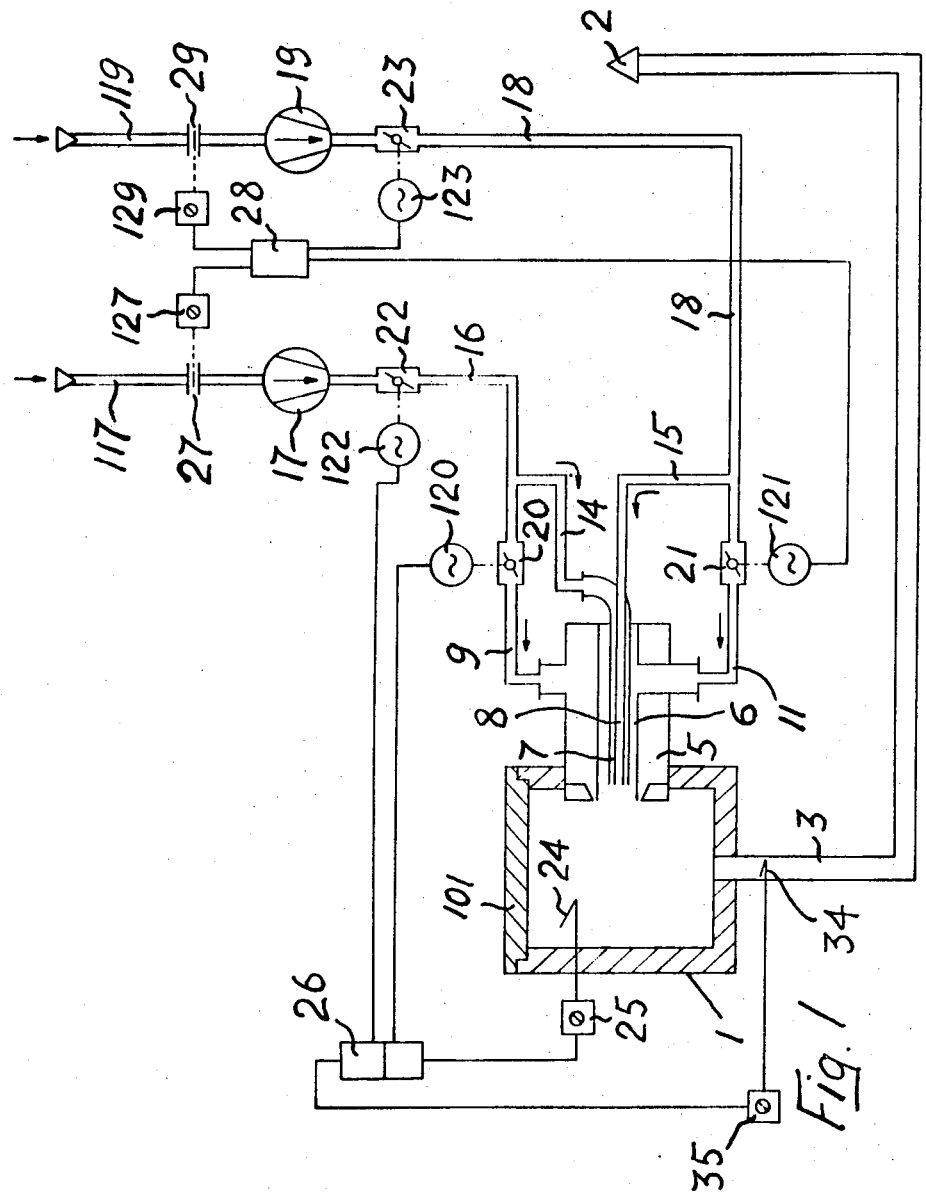

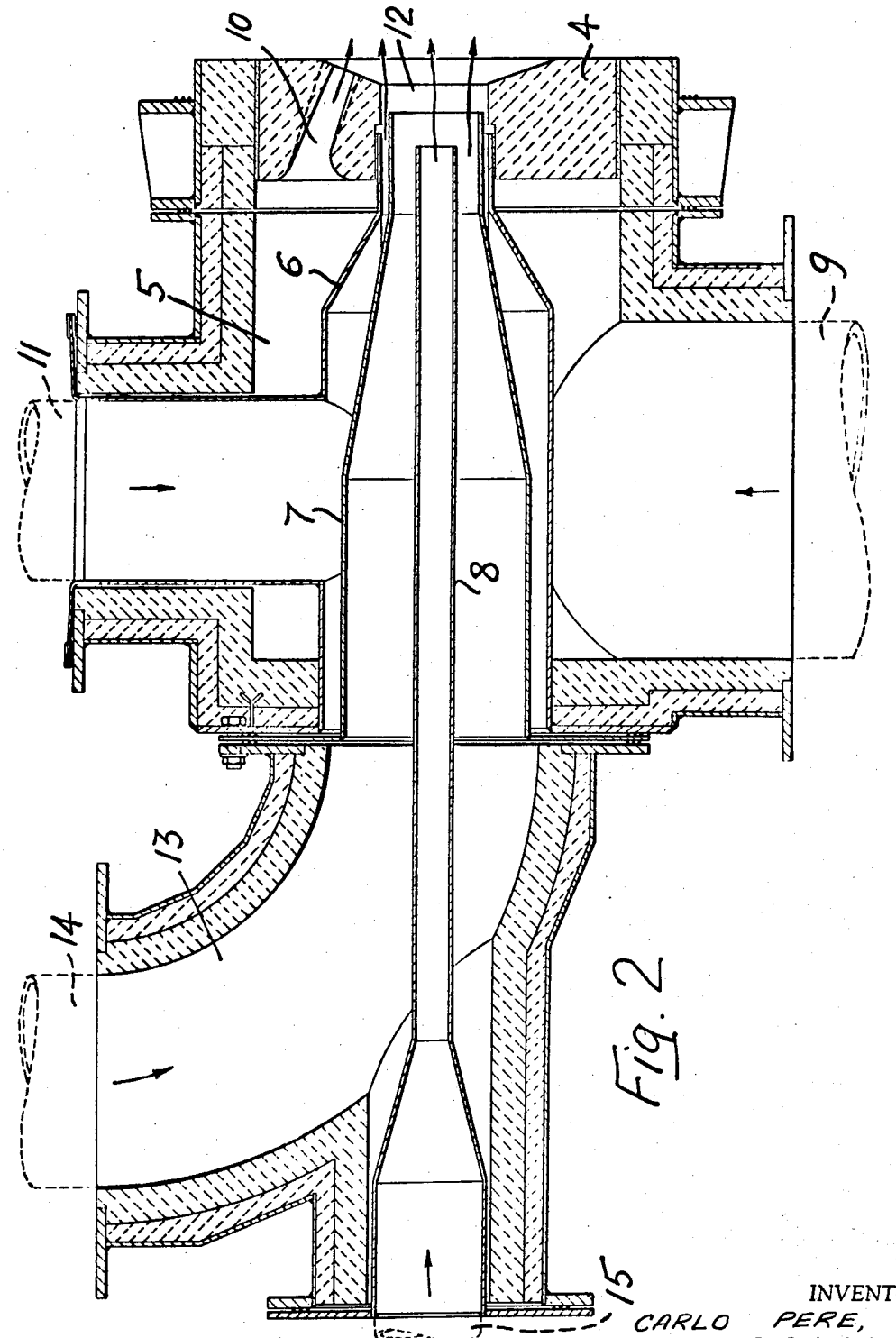

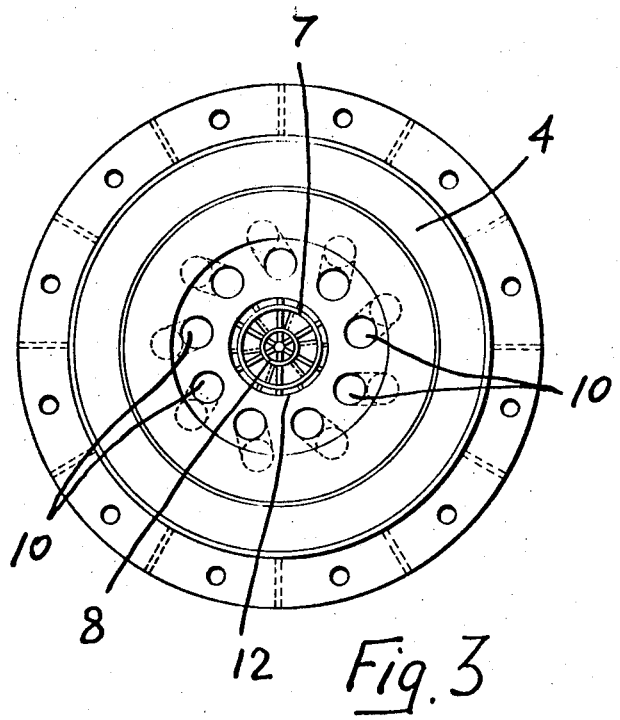

AUTOMATIC CONTROL APPARATUS FOR SOAKING PIT FURNACES

BACKGROUND OF THE INVENTION

The invention relates to an automatic regulating device for pit furnaces for heating metal ingots, wherein the power of the pit furnace burner arrangement is controlled by temperature sensing means responding to the furnace temperature.

The problem underlying the invention consists in providing a regulating device of this kind which by means of a simple and economical construction permits reliable control of the furnace temperature and in particular the superheating of the furnace space walls in the heating-up period of the heating operation to a maximum temperature which is higher than the maximum permissible surface temperature, for example the melting temperature, of the metal ingots. At the same time it must prevent the heating of the metal ingots above this maximum permissible surface temperature, in particular in the following soaking period of the heating operation, and thereby ensures rapid uniform soaking of the metal ingots to the desired final temperature, for example rolling temperature.

SUMMARY

According to the invention, this problem is solved with a regulating device of the type first mentioned above, which includes at least one temperature sensor responding to the temperature of the furnace space walls and controlling the burner arrangement in the heating-up period of the heating operation, and at least one other temperature sensor responding to the temperature of the combustion gases and controlling the burner arrangement in the soaking period of the heating operation.

The invention is based on the realization that in order to achieve more rapid heating of the metal ingots the furnace space walls can be heated by the pit furnace burner arrangement, working at full power, during the heating-up period of the heating operation to a maximum temperature which is higher than the highest permissible surface temperature of the metal ingots without thereby raising the temperature of the combustion gases in the furnace space, which are cooled by giving up heat to the furnace space walls and to the metal ingots, above the aforesaid maximum permissible surface temperature of the metal ingots. In the subsequent soaking period of the heating operation, during which the burner arrangement of the pit furnace works with reduced power, the heat stored in the superheated furnace space walls is given up both to the metal ingots and to the combustion gases in the furnace space, whereby the temperature of the combustion gases is further raised in the direction of the final temperature of the metal ingots but must not exceed the maximum permissible surface temperature of the latter. This condition depends on the one hand on the amount of heat stored in the furnace space walls, that is to say on the maximum temperature of the latter which is reached in the heating-up period with the burner arrangement at full power, and on the other hand on the working power or working time of the burner arrangement in the soaking period. According to the invention these relationships are taken into account in the regulation of the pit furnace by controlling the burner arrangement during the heating-up period by at least one temperature sensor responding to the temperature of the furnace space walls and during the soaking period by at least one temperature sensor responding to the temperature of the combustion gases. By this means, with relatively low technical expenditure and with the maximum reliability, the advantageous superheating of the furnace space walls to a maximum temperature higher than the maximum permissible surface temperature of the metal ingots is on the one hand made possible, while on the other hand the detrimental excess of this maximum permissible temperature limit by the temperature of the combustion gases or by the surface temperature of the metal ingots is prevented.

According to another advantageous feature of the invention the combustion gas temperature sensor is disposed in a region of the pit furnace in which no heat exchange takes place between the combustion gases on the one hand, the metal ingots or furnace space walls on the other hand. As a further development of the invention, a form of construction has been found favorable in which the combustion gas temperature sensor is disposed in the waste gas offtake of the pit furnace, preferably as close as possible to the furnace space. In these arrangements the combustion gas temperature sensor is removed from the disturbing influence of local temperature differences of the combustion gases in the furnace space or from direct heating by the furnace space walls and metal ingots.

The invention may be put into effect with various heating methods, and also in conjunction with various constructions or modes of operation of the pit furnace, burner arrangement, and regulating or control device. In a particularly convenient form of construction the two temperature sensors are associated with a combined automatic switch and control device which, when the furnace wall temperature sensor (which was switched on in the heating-up period of the heating operation) responds to an adjusted maximum temperature of the furnace space wall, reduces the power of the burner arrangement. Furthermore, by switching off the furnace wall temperature sensor and switching on the combustion gas temperature sensor, it switches the regulating device over to said combustion gas temperature sensor, which on responding to an adjusted maximum temperature of the combustion gases, thereupon further reduces the power of the burner arrangement or puts the latter out of operation.

BRIEF DESCRIPTION OF THE DRAWINGS

FIG. 1 illustrates diagrammatically a pit furnace with the associated burner arrangement and the regulating device according to the invention;

FIG. 2 is a longitudinal section of a burner head provided with two coaxial burners; and, FIG. 3 is an elevation of the burner head, viewed from the right-hand side in FIG. 2.

DESCRIPTION OF THE PREFERRED EMBODIMENT

FIG. 1 illustrates diagrammatically a pit type furnace 1 with a cover plate 101 and waste gas offtake 3 leading into a chimney 2. The pit type furnace 1 is heated with the aid of a burner arrangement which is illustrated diagrammatically in FIG. 1 and of which a preferred form of construction is shown in FIGS. 2 and 3. This burner arrangement consists of at least one burner head 4 provided in the side wall of the pit type furnace 1 and associated with two burners disposed coaxially around one another and operated with a mixture of gaseous fuel, for example coke oven gas and air for combustion.

In the example of embodiment illustrated the two burners consist of an air chamber 5 and three tubes 6, 7, and 8 disposed in said air chamber coaxially around one another and spaced radially apart. The air chamber 5 is connected on the one hand to an air supply pipe 9 and on the other hand to a ring of air outlet nozzles 10 disposed in the burner head. The air outlet nozzles 10 are inclined so as to converge towards the longitudinal axis of the burner and at the same time the axes of the nozzles 10 lie obliquely to the respective radial planes, so that the nozzle axes do not pass through the burner axis, as can be seen in particular from FIG. 3. The outer tube 6 is joined to a fuel supply pipe 11 and leads into a central outlet aperture 12 in the burner head 4. The other two coaxial pipes 7 and 8 likewise lead into the central outlet aperture 12 of the burner head 4, the intermediate tube 7 being connected by an elbow 13 to an air supply pipe 14 and the innermost tube 8 to a fuel supply pipe 15. The air chamber 5, with the air outlet nozzles 10, and the outer fuel tube 6 form a first, outer burner associated with the air and fuel supply pipes 9 and 11. The intermediate air tube 7 and the innermost fuel tube 8 form a second, inner burner with the associated air and fuel supply pipes 14 and 15.

The air supply pipes 9, 14 of both the outer burners 5, 6 and the inner burner 7, 8 are connected through an air manifold 16 to a common air blower 17, as illustrated particularly in FIG. 1. The fuel supply pipes 11 and 15 of the two burners 5, 6 and 7, 8 are likewise connected by a fuel manifold 18 to a common fuel blower 19. Throttle elements 20 and 21 respectively are provided in the air supply pipe 9 and in the fuel supply pipe 11 of the outer burner 5, 6. The air and fuel manifolds 16 and 18 respectively are likewise each provided with a throttle element 22 and 23 respectively. The throttle elements 20, 21, 22, 23 are operated by electrical adjusting motors 120, 121, 122 and 123 respectively.

The adjusting motors 120 and 122 of the throttle elements 20 and 22 in the air supply pipe 9 of the outer burner 5, 6 and in the air manifold 16 associated with the two burners 5, 6 and 7, 8 are controlled by a control device 26, which is known in itself. This control device 26 is connected to two temperature sensors 24 and 34 respectively through respective thermoelectric transducers 25 and 35 respectively. The temperature sensor 24 is disposed in the pit furnace 1 and responds to the temperature of the furnace space wall. The other temperature sensor 34 on the other hand is disposed in the waste gas offtake 3, preferably as close as possible to the pit furnace space, and responds to the temperature of the combustion gases. The control device 26 is constructed, likewise in a manner known in itself, as a combined switch and control device, which automatically switches the two temperature sensors 24, 34 on and off alternately in the manner described in greater detail below.

The suction pipes 117 and 119 of the air and fuel blowers 17 and 19 respectively each contain a flow measuring device 27 and 29 respectively, these devices being known in themselves. These measuring devices 27, 29 are each connected by a respective transducer 127 and 129 to a controller 28, which is likewise known in itself and which controls the adjusting motor 121 of the throttle element 21 in the fuel supply pipe 11 of the outer burner 5, 6 and the adjusting motor 123 of the throttle element 23 in the fuel manifold 18 associated with the two burners 5, 6 and 7, 8. The controller 28 is constructed in a manner known in itself so that in the event of fluctuations of the flows in the suction pipes 117, 119 of the air and fuel blowers 17, 19, and particularly in the event of variations of the air flow in the suction pipe 117 of the air blower 17, it operates the throttle elements 21, 23 so as to maintain a predetermined, adjustable and readjustable fuel/air ratio in both the coaxial burners.

At the beginning of the heating-up period of the heating operation the control device 26 is connected only to the furnace wall temperature sensor 24, while the combustion gas temperature sensor 34 is switched off. The throttle elements 20, 21 in the air and fuel supply pipes 9, 11 of the outer burner 5, 6 are open.

The two burners 5, 6 and 7, 8 work at full power. The throttle elements 22 and 23 in the air and fuel manifolds 16, 18 are opened to such an extent that on the one hand the adjusted ratio of fuel to air for combustion and on the other hand the total inflow of fuel and air for combustion required for maximum power operation of both burners 5, 6 and 7, 8 are achieved. The pressure in the air and fuel manifolds 16, 18 and in the air and fuel supply pipes 9, 11 and 14, 15 branched off therefrom and feeding the two burners 5, 6 and 7, 8 respectively, is so high that the pressure-dependent, correspondingly high admission speed of the fuel and air for combustion entering the pit type furnace 1 gives rise to great turbulence of the combustion gases and consequently uniform distribution of the combustion gases and of the temperature in the furnace space.

In the heating-up period the still relatively cold metal ingots absorb heat from the hot combustion gases, while at the same time the walls of the pit furnace 1 are heated. The heating-up period lasts until the walls of the pit furnace reach a determined temperature which is higher than the maximum permissible surface temperature of the metal ingots. The temperature sensor 24 responds to this maximum temperature of the furnace base walls and by means of the control device 26 and the adjusting motor 120 effects the gradual closing of the throttle element 20 in the air supply pipe 16 of the outer burner 5, 6. The measuring instrument 27 disposed in the suction pipe 117 of the air blower 17 responds to the reduction of air flow produced by the closing of the throttle element 20. The controller 28 consequently also closes, by means of the adjusting motor 121, the throttle element 21 disposed in the fuel supply pipe 11 of the outer burner 5, 6, which it does simultaneously with the air throttle element 20 and in accordance with the adjusted fuel/air ratio which is to be maintained. The closing of the throttle elements 20 and 21 in the air and fuel supply pipes 9 and 11 respectively of the outer burner 5, 6 starts at the end of the heating-up period and terminates at an intermediate moment of time during the following soaking period. The pressure of the air for combustion and of the fuel in the outer burner 5, 6 consequently gradually drops to zero in the period of time mentioned. Consequently, during this period of time the total inflow of fuel and air for combustion also drops progressively from the 100 percent value corresponding to the full power of both burners 5, 6 and 7, 8 to a value corresponding only to full power of the inner burner 7, 8 which continues to operate. At the same time the pressure of the fuel and of the air for combustion in the inner burner 7, 8 gradually rises, since with the progessive throttling of the air and fuel supply pipes 9, 11 of the outer burner 5, 6 the corresponding pressure losses fall off and the inner burner 7, 8 is now fed by the entire delivery pressure of the air and fuel blowers 17, 19. The pressure rise in the inner burner 7, 8 is accompanied by an increase of the speed of admission of the air for combustion and fuel into the pit furnace 1. This increase in speed of the air for combustion and fuel feeding the inner burner 7, 8 is so great that even though the total volume of combustion gases produced is now smaller it produces approximately the same intensive turbulence of the combustion gases in the pit furnace 1 as in the heating-up period, or even produces still greater turbulence and consequently, despite the reduced power of the burner arrangement, ensures uniform distribution of the combustion gases and of the temperature in the furnace space.

A pulse produced when the furnace wall temperature sensor 24 responds to the adjusted maximum temperature of the furnace walls not only brings about the operation of the adjusting motor 120 of the throttle element 20 with the aid of the control device 26, but at the same time also switches over said control device 26 from the furnace wall temperature sensor 24 to the combustion gas temperature sensor 34. The furnace wall temperature sensor 24 is thus automatically switched off and the combustion gas temperature sensor 34 switched on.

At the end of the heating-up period the temperature of the furnace space walls is higher and the temperature of the combustion gas is lower than the maximum permissible surface temperature or than the desired final temperature of the metal ingots. In consequence of the throttling of the outer burner 5, 6 and the corresponding reduction of the supply of heat, the superheated furnace space walls now give up their stored heat to the metal ingots. The maintenance of the intensive turbulence of the combustion gases in the pit furnace space substantially assists the transfer of heat from the furnace space walls to the metal ingots, since it brings about a transmission of valve also, or mainly, through convection and not through pure radiation alone. Consequently the temperature of the furnace space wall retains its maximum value for a relatively short time and then gradually declines in the direction of the final temperature of the metal ingots. The temperature of the combustion gases in the pit furnace space on the other hand rises further in the direction of the desired final temperature of the metal ingots in consequence of the absorption of heat from the superheated furnace space walls and from the inner burner 7, 8, which continues in operation. When the temperature of the combustion gases reaches a determined maximum value, which is still lower than the maximum permissible surface temperature of the metal ingots, the combustion gas temperature sensor 34 disposed in the waste gas offtake 3 now responds and by means of the control device 26 and the adjusting motor 122 brings about the gradual closing of the throttle element 22 in the air manifold 16 common to the two burners 5, 6 and 7, 8. The controller 28, which maintains unchanged the adjusted ratio of air to fuel, simultaneously closes the throttle element 23 in the fuel manifold 18 by means of the adjusting motor 123. The inflow of fuel and air for combustion drops further from the value corresponding to full power of the inner burner 7, 8, while at the same time the pressure of the fuel and of the air for combustion in the inner burner 7, 8 drops from the maximum value attained, until said burner is put completely out of action.

The invention is not restricted to the details of the example illustrated and described.

We claim:

1. An automatic regulating device for pit furnaces of the type including a pair of burners, walls enclosing a furnace space, for heating metal ingots and a waste gas off-take leading from the furnace space, wherein the power of the pit furnace burners is controlled by at least two temperature sensors, at least one of the temperature sensors responding to the temperature of the furnace space walls and controlling the burners in the heating-up period of the heating operation, at least one additional temperature sensor disposed in the waste gas off-take of the furnace close to the furnace space responding to the temperature of the combustion gases and controlling the burners in the soaking period of the heating operation, said pair of burners being disposed coaxially around one another and each having a fuel supply pipe and an air supply pipe, whereon on the one hand the fuel supply pipes and on the other hand the air supply pipes of both burners are connected through respective fuel and air manifolds to a common fuel blower and air blower respectively, and both the fuel and air supply pipes of one burner and the fuel and air manifolds common to the two burners are provided with respective throttle elements, of which the throttle element in the air supply pipe of one burner and the throttle element in the air manifold are controlled through a control device by temperature sensors responding to the temperature in the pit furnace, while on the other hand the throttle element in the fuel supply pipe of the aforesaid burner and the throttle element in the fuel manifold are controlled by a controller maintaining an adjusted ratio of fuel to air wherein the furnace wall temperature sensor controls the throttle element in the air supply pipe of the one burner and the combustion gas temperature sensor controls the throttle element in the air manifold common to the two burners.

* * * * *